US005496505A

United States Patent [19]

Walla et al.

[11] Patent Number: 5,496,505

[45] Date of Patent: Mar. 5, 1996

[54] AERATING NOZZLE FOR AERATING LIQUIDS CONTAINING ORGANIC SUBSTANCES

[75] Inventors: Günter Walla, Freising; Simon Redl, Reichertshausen, both of Germany

[73] Assignee: Anton Steinecker Entwicklungs GmbH & Co., Freising/Attaching, Germany

[21] Appl. No.: 198,144

[22] Filed: Feb. 17, 1994

[30] Foreign Application Priority Data

Feb. 26, 1993 [DE] Germany .............................. 9302862 U

[51] Int. Cl.[6] .................................. B01F 5/04; C02F 3/12

[52] U.S. Cl. ..................................... 261/76; 261/DIG. 13; 261/DIG. 75

[58] Field of Search ............................... 261/76, DIG. 13, 261/DIG. 75

[56] References Cited

U.S. PATENT DOCUMENTS

| | | | |
|---|---|---|---|
| 721,036 | 2/1903 | Gwynne et al. | 261/DIG. 75 |
| 1,747,687 | 2/1930 | Wheeler | 261/DIG. 75 |
| 3,282,227 | 11/1966 | Nielsen | 261/DIG. 75 |
| 3,646,607 | 2/1972 | Power | 261/DIG. 75 |
| 4,134,547 | 1/1979 | Gamst | 261/DIG. 75 |
| 4,230,570 | 10/1980 | Irving | 261/DIG. 75 |
| 4,743,405 | 5/1988 | Durao et al. | 261/76 |
| 4,861,352 | 8/1989 | Cheng | 261/DIG. 75 |
| 4,867,918 | 9/1989 | Kiyonaga et al. | 261/DIG. 75 |
| 4,911,826 | 3/1990 | Haraeh et al. | 261/DIG. 75 |
| 4,992,216 | 2/1991 | Saita et al. | 261/DIG. 75 |
| 5,073,309 | 2/1991 | Bosquet et al. | 261/DIG. 75 |
| 5,240,650 | 8/1993 | Wiederhold et al. | 261/DIG. 75 |

FOREIGN PATENT DOCUMENTS

WO9204972 2/1992 WIPO .

*Primary Examiner*—Khanh P. Nguyen
*Attorney, Agent, or Firm*—Tilton, Fallon, Lungmus & Chestnut

[57] ABSTRACT

The present invention relates to an aerating nozzle for aerating liquids containing organic substances. To keep the foam formation in organic substances to be aerated within a controlled limits, the present invention suggests that the angles of inclination of the side walls defining the liquid channel should nowhere be greater than 30° relative to the longitudinal axis of the aerating nozzle which extends in the direction of flow, with the distribution bushing whose liquid channel is of a straight configuration being arranged such that is can be replaced by distribution bushings which differ in number and/or size of the gas entry openings.

32 Claims, 2 Drawing Sheets

AERATING NOZZLE FOR AERATING LIQUIDS CONTAINING ORGANIC SUBSTANCES

DESCRIPTION

The present invention relates to an aerating nozzle for aerating liquids containing organic substances, the aerating nozzle comprising a liquid channel whose boundary side walls have angles of inclination in areas of different diameters, and at least one gas entry opening in an aeration region in which the liquid channel is defined by a distribution bushing which is surrounded by an outer sleeve.

Such an aerating nozzle is known from WO 92/04972. With such an aerating nozzle, the gas flowing through the gas entry openings is evenly distributed around the liquid flow. Gas is admixed in a laminar manner during further movement of the liquid flow due to the inclined side walls of the liquid channel. It has been found in practice, especially when specific organic substances such as yeast-containing worts are aerated, that turbulences still occur on the one hand when gas is being admixed and it has been recognized on the other hand that the necessary amount of entering gas for aerating purposes is also not controllable in an adequate manner. In some cases this has the effect that the liquids containing the organic substances tend to foam because of insufficient aeration, as can e.g. be observed by the augmentation of yeast in wort during beer brewing. This foaming of the wort should be controllable because of the very disadvantageous effect on the augmentation of yeast.

In view of the prior art, it is the object of the invention to provide an aerating nozzle wherein the foam formation in liquids containing organic substances to be aerated can be kept within controlled limits.

This object is achieved in accordance with the invention in that the angles of inclination of the side walls defining the liquid channel are nowhere greater than 30° relative to the longitudinal axis of the aerating nozzle which extends in the direction of flow, with the distribution bushing whose liquid channel is of a straight configuration being arranged in such a manner that it can be replaced by distribution bushings which differ in number and/or size of the gas entry openings.

Since the angle of inclination of the side walls is not greater than 30° at any point of the liquid channel, the flow remains almost laminar. The desired gas entry can be adapted in an optimum and very flexible manner to the different liquids by replacing the distribution bushings. A well-matched combination of the angles of inclination in connection with the entry of gas guarantees not only a moderately foaming mixture of gas with liquid, but the expansion chamber used in the prior art can also be dispensed with on account of the good mixing results. Since there is no expansion chamber, the aerating nozzle can be made considerably smaller, more lightweight and thus more inexpensive, so that the ratio of useful content to total content is within reasonable limits.

It is advantageous when the distribution bushing is surrounded over a major portion of its length by a closed annular chamber which is provided with at least one gas supply opening. This permits the supply of gas to a plurality of randomly arranged gas entry openings in a uniform manner through the gas supply opening.

It has been found that it is very advantageous when the sum of the cross-sectional areas of the gas supply openings is at least three times the sum of the cross-sectional areas of the gas inlet area formed by the total of the gas entry openings. The overpressure in the annular chamber which is needed for the penetration of gas into the liquid flow can thus be kept constant in an improved manner.

It is also of advantage when the gas entry openings are bores and are evenly distributed in annular fashion on the circumference of the distribution bushing. With such an arrangement, the gas flows are uniformly distributed on the surface of the liquid flow.

It is of special advantage when the gas entry openings of the distribution bushings are arranged at the beginning of the aeration region when viewed in the direction of flow. As a result of this arrangement, the mixing of the gas bubbles in the liquid can already be started in the distribution bushing.

It has been found that it is very advantageous when the bore axes of the bores in the distribution bushing are inclined under an inflow angle "$\alpha$" relative to the longitudinal axis of the aerating nozzle which extends in the direction of flow. This inflow angle "$\alpha$" offers another possibility of controlling the intensity of the bubble formation. Very good and uniform results with respect to the mixing of the gas bubbles in the liquid are obtained when the inflow angle "$\alpha$" is 45° and is inclined towards the direction of flow and specifically when the bores have a maximum diameter of 1.5 mm.

The cross-section of the channel entrance into the aerating nozzle is very often not identical with the channel cross-section of the aeration region. It would therefore be advantageous if the liquid channel had a conically extending inlet region from the liquid entrance into the aerating nozzle to the aeration region when viewed in the direction of flow. Differences would thereby be compensated for and there would be a smooth transition.

When viewed in the direction of flow the liquid channel preferably comprises an intermediate region following the aeration region, with the intermediate region passing into a mixing region which is provided at the liquid outlet and has a conical wall. This intermediate region ensures on the one hand that the aeration region and the mixing region are interconnected. On the other hand the conical wall guarantees a change in the flow rate of the liquid in the channel, whereby the gas bubbles are mixed with the liquid in an improved manner.

The liquid channel may advantageously have the shape of a hollow cylinder in the aeration region and in the mixing region, the liquid channel in the areation region having an inner diameter "D1" which is greater than the inner diameter "D2" of the liquid channel in the mixing region. Hollow cylinders are best suited for a laminar flow.

To achieve an excellent and uniform mixture of the liquid with the gas bubbles it has been found that a situation where the length of the mixing region corresponds at least to the simple inner diameter "D2" of the liquid channel of the mixing region is very advantageous. Likewise, it has been found that a length of the intermediate region at least three times the extent of the diameter difference from "D1" to "D2" is of advantage.

It is advantageous when the annular chamber is formed by inserting the distribution bushing, which is formed as an integral member, into the outer sleeve, with the distribution bushing forming an inner wall and the outer sleeve forming an outer wall of the annular chamber. As a result, the distribution bushing can easily be separated from the outer sleeve at any time, so that the aerating nozzle can be cleaned without difficulty. If there should be any damage to individual members, these could be replaced independently of one another.

In a preferred embodiment the gas supply opening and the conical wall may be formed in the outer sleeve.

It is of advantage when the liquid channel in the mixing region is formed by a connecting piece. This may simplify production and overall length.

In a preferred embodiment the connecting piece and the outer sleeve may be welded to each other. In a second advantangeous embodiment the connecting piece and the outer sleeve may be integral. In the case of a large-scale production an integral structure would probably be less expensive whereas special wishes could be considered at short notice in the case of a welded structure.

For an exact positioning of the distribution bushing in the outer sleeve it would be of benefit if at least one outer diameter of the distribution bushing was formed with the inner diameter of the outer sleeve as a fit.

To be able to keep the overpressure in the annular chamber constant, it would be of benefit if the annular chamber was sealed at both sides.

It is here of advantage when the outer sleeve has a stop surface for a face of the distribution bushing when the latter is inserted into the outer sleeve, especially when a seal is arranged between the stop surface of the outer sleeve and the corresponding face of the distribution bushing. The stop surface can thus be used for fixing the outer sleeve in axial direction and may simultaneously serve sealing purposes.

In the preferred embodiment of the invention the distribution bushing is fully received in the outer sleeve and pressed with a closure onto the stop surface. Slipping of the distribution bushing within the outer sleeve is thereby excluded.

A seal may preferably be arranged between the closure and a face of the distribution bushing. Furthermore, it is of advantage to seal the closure, for this will additionally seal the annular chamber to the outside.

It would be possible to form the liquid channel in the inlet region within the closure. A suitable inlet region could thereby be obtained for every cross-section of the liquid inflow by changing the closure.

To be able to carry out a change of closure as easily as possible, it would be of advantage if the closure was screwable.

In the preferred embodiment of the invention the closure may be screwed with a union nut to a threaded connection piece. This type of screw connection can be implemented in a very simple manner, especially when the threaded connection piece is arranged at the beginning of the aeration region outside of the outer sleeve and welded thereto. In the case of a large scale production another type would be conceivable wherein the threaded connection piece is arranged at the beginning of the aeration region outside of the outer sleeve and made integral therewith.

To obtain a simple connection of the aerating nozzle to a gas supply line, it is of advantage when a gas supply connection piece is arranged at each gas supply opening on the outer sleeve. On a small scale, welding of the gas supply connection nozzle to the outer sleeve is of interest. By contrast, the integral construction of the gas supply connection piece with the outer sleeve is less expensive on a large scale.

These and other advantages that follow from the aerating nozzle according to the invention shall be explained in more detail with reference to an embodiment shown in the attached drawings, in which.

Figure 1:
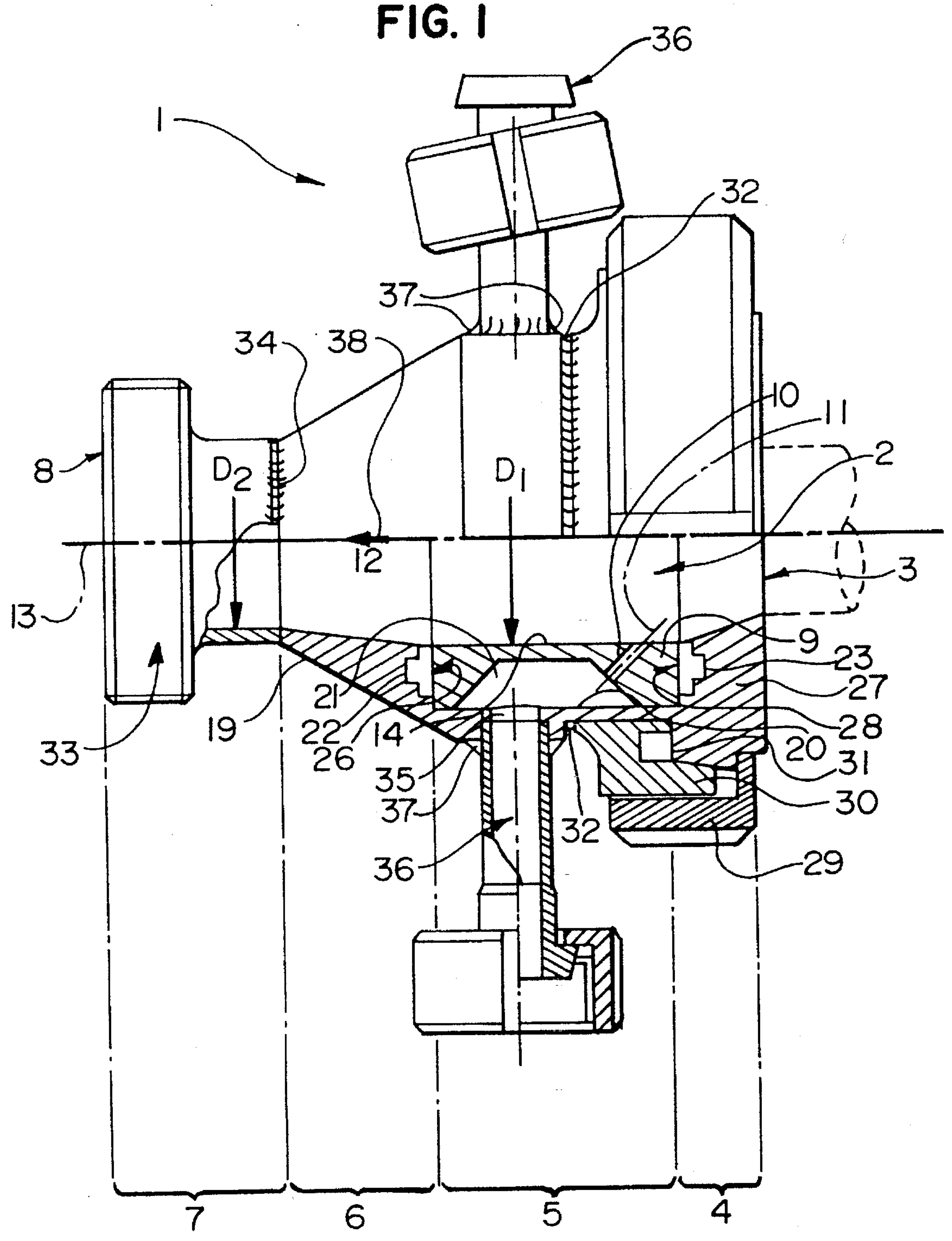
FIG. 1 is an approximately semisectional view of an embodiment of the aerating nozzle of the invention.
Figure 2:
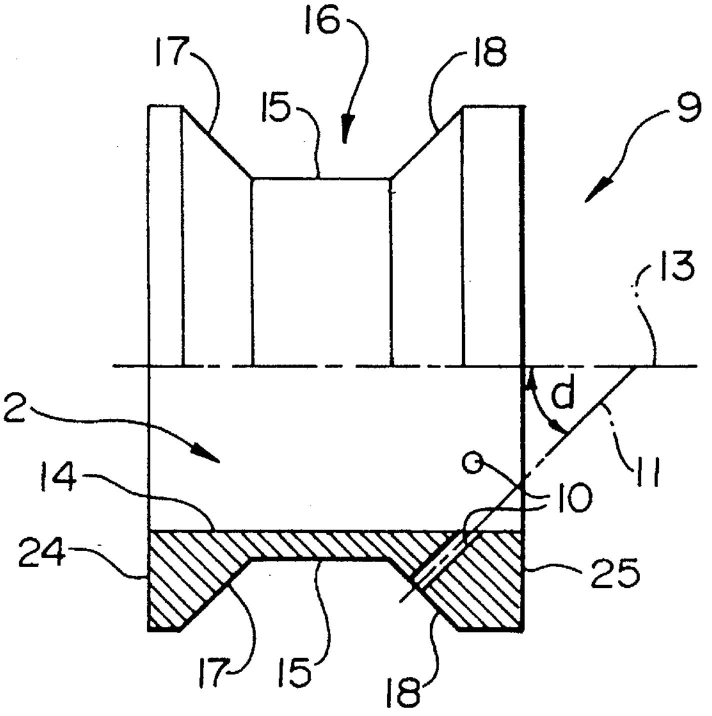
FIG. 2 is a semisectional view of the distribution bushing of the aerating nozzle of the invention.
Figure 3:
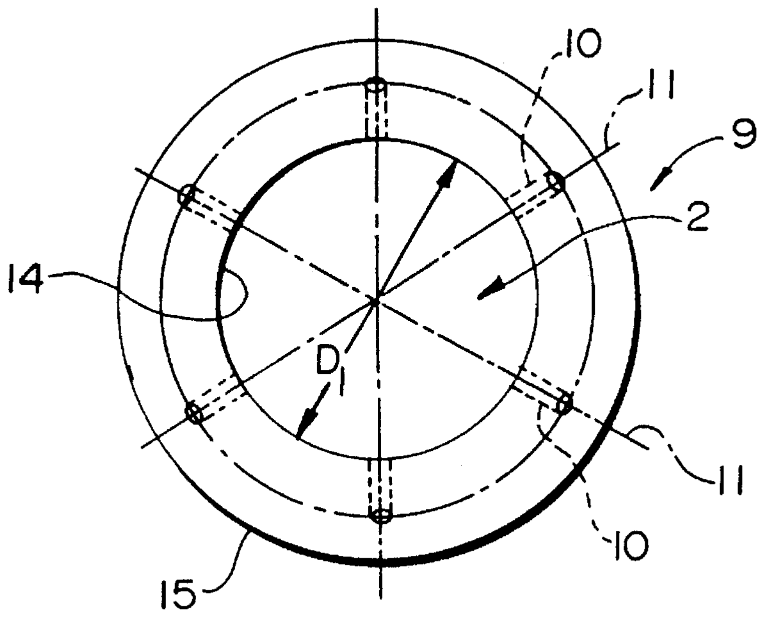
FIG. 3 is a top view on the distribution bushing.

The aerating nozzle 1 comprises a liquid channel 2 which, when viewed in flow direction 38, is divided into four adjoining regions. Starting from the liquid entrance 3, an inlet region 4, an aeration region 5, an intermediate region 6 and a mixing region 7 are successively arranged. The end of the mixing region 7 forms the liquid outlet 8.

In the aeration region 5, the liquid channel 2 has the shape of a hollow cylinder with an inner diameter D1 in an aerating nozzle 9. Six bores 10 with a diameter of 1 mm are arranged in the wall of the aerating nozzle 9 in such a manner that they are evenly ,distributed radially on the circumference. The bore axes 11 of bores 10 are inclined under an inflow angle "α" by 45° towards flow direction 38 relative to the longitudinal axis 13 of the aerating nozzle 1 which extends in flow direction 38. The piercing point of bores 10 through an inner wall 14 of the distribution bushing 9 is located in the front portion of the aeration region 5. The distribution bushing 9 is provided on its outer wall 15 over the major portion of its length with a radially surrounding trapezoidal groove 16 which opens to the outside. The lateral flanks 17 and 18 of groove 16 are each chamfered by 45° relative to the longitudinal axis 13.

The distribution bushing 9 is surrounded by an outer sleeve 19. The outer wall 15 of the distribution bushing 9 forms a closed annular chamber 21 together with a hollow-cylindrical inner wall 20 of the outer sleeve 19. The annular chamber 21 is sealed relative to the liquid channel 2 by means of two seals 22 and 23 that are arranged on the faces 24 and 25 of the distribution bushing 9. The outer sleeve 19 has a stop surface 26 for the face 24 of the distribution bushing 9 for the insertion thereof. Seal 22 is here arranged between the stop surface 26 and face 24. A closure 27 which has a second stop surface 28 for the face 25 of the distribution bushing 9 is arranged in the inlet region 4. The seal 23 is arranged between the face 25 and the second stop surface 28 of the closure.

Closure 27 is screwed by means of a union nut 29 to a threaded connection piece 30. A seal 31 is also arranged between closure 27 and the threaded connection piece 30.

The threaded connection piece 30 is welded with a surrounding weld seam 32 to the external sidle of the outer sleeve 19.

The liquid channel 2 in the inlet region 4 is formed in closure 27. When viewed in flow direction 38, its liquid channel 2 has a conically opening wall which connects the liquid entrance 3 to the liquid channel 2 of the aeration region 5.

The liquid channel 2 of the intermediate region 6 is formed in the outer sleeve 19. This liquid channel 2 has a conical wall 12 which connects the liquid channel 2 of the mixing region 7 to that of the aeration region 5. The liquid channel 2 of the mixing region 7 is formed in a connecting piece 33 such that it has the shape of a hollow cylinder and an inner diameter D2 which is smaller than the inner diameter D1. Connecting piece 33 is welded to the outer sleeve 19 on the face with a radially surrounding weld seam 34.

The mixing region 7 has the same length as the inner diameter D2 of the liquid channel 2 in the mixing region 7. The length of the intermediate region 6 is five times the extent of the diameter difference from D1 to D2.

In the aeration region 5 the outer sleeve 19 has two opposite gas supply openings 35 which permit a gas supply to the annular channel 21. A gas supply connection piece 36 which is connected to the outer sleeve 19 by means of a radially surrounding weld seam 37 is arranged at each gas supply opening 35. The sum of the cross-sectional areas of the gas supply openings 35 is thirty-three times greater than the sum of the cross-sectional areas formed by the six bores 10. The two outer ends of the aeration nozzle 1 and the gas supply connection piece 36 are provided with standard connections.

The function and operation of the aerating nozzle shall now be described in the following with reference to a method for aerating wort and yeast during the supply of pure yeast.

Wort is supplied to the liquid channel 2 through the liquid entrance 3 at an overpressure of between 1.5 and 8 bar, normally at about 2 bar and a volume flow of 0.5 to 200 $m^3$/hour. Air is supplied via the gas supply openings 35 at an overpressure of 1.5 to 8 bar and a volume flow of 0.5 to 100 liter/minute to the annular chamber 21.

Since the sum of the cross-sectional areas of the gas supply openings 35 is at least three times the cross-sectional area of the gas entry surface formed by the total of gas entry openings 10, a uniform overpressure builds up in the annular chamber 21. As a consequences, gas flows through the bores 10 of the distribution bushing 9 into the liquid channel 2 and evenly surrounds the liquid flow into the aeration region 5. The inclination of the inflow angle "α" under which the bore axes 11 are inclined relative to the longitudinal axis 13 which extends in flow direction 38 has a decisive influence on the degree of mixing that can already be observed upon gas entry. If the angle has a pronounced inclination relative to flow direction 38, the mixing process is enhanced. Liquid and gas flow together through the conical liquid channel 2 of the transition region 6 into the mixing region 7 thereof. Since the liquid channel diameter is reduced from D1 to D2, the flow rate of the liquid flow is increased, whereby mixing of the gas with the liquid is promoted. Since the length of this intermediate region 6 is at least three times the extent of the diameter difference from D1 to D2, the transition is very continuous. As a consequence, liquid and gas are mixed in a laminar manner, and turbulences are avoided during the mixing process.

An optimally matched distribution bushing 9 can be employed for every liquid owing to the replaceability of the distribution bushing 9. The distribution bushings differ from one another in the number and/or size of the bores 10 and by the inflow angle "α" of the bore axes 11. This prevents not only wort from foaming, but an optimum mixture can be adjusted in the aerating nozzle, so that an expansion chamber which has so far been used in the prior art can be dispensed with.

We claim:

1. An aerating nozzle for aerating liquids containing organic substances comprising side walls which define a liquid channel extending between a liquid entrance (3) and a liquid outlet (8), said side walls having angles of inclination and areas of different diameters and having at least one gas entry opening in an aeration region in which said liquid channel is defined by a distribution bushing which is surrounded by an outer sleeve, said angles of inclination of all of said side walls which define said liquid channel (2) being not greater than 30° relative to the longitudinal axis (13) of said aerating nozzle (9) which extends in a direction of flow (38), said distribution bushing being arranged in such a manner that it can be replaced by distribution bushings (9) that differ in number and/or size of said gas entry openings, said side walls of said distribution bushing extending parallel relative to the longitudinal axis (13), and said side walls of said liquid channel diverging before the distribution bushing and converging after the distribution bushing in the direction of flow, said gas entry openings comprising bores which extend along respective bore axes (11) which are inclined along an inflow angle α towards the direction of flow.

2. An aerating nozzle according to claim 1, wherein said distribution bushing (9) is surrounded over a major portion of its length by a closed annular chamber (21) which is provided with at least one gas supply opening (35).

3. An aerating nozzle according to claim 2, wherein said gas supply openings (35) define respective cross-sectional areas and said gas entry openings (10) define a total cross-sectional gas entry area, the sum of said cross-sectional areas of said gas supply openings (35) being at least three times said total cross-sectional gas entry area.

4. An aerating nozzle according to claim 3, wherein said gas entry openings (10) are bores and are evenly distributed in ring-like fashion on the circumference of said distribution bushing (9).

5. An aerating nozzle according to claim 4, wherein said gas entry openings (10) of said distribution bushing (9) are arranged at a beginning of said aeration region (5) when viewed in the direction of flow (38).

6. An aerating nozzle according to claim 1, wherein said inflow angle α is approximately 45°.

7. An aerating nozzle according to claim 4, wherein said bores (10) have a maximum diameter of 1.5 mm.

8. An aerating nozzle according to claim 1, wherein when viewed in the direction of flow (38), said liquid channel (2) has a conically diverging inlet region (4) from said liquid entrance (3) into said aerating nozzle (9) to said aeration region (5).

9. An aerating nozzle according to claim 2, wherein when viewed in the direction of flow (38), said liquid channel comprises an intermediate region (6) following said aeration region (5), said intermediate region (6) following said aeration region (5), said intermediate region (6) passing into a mixing region (7) provided at a liquid outlet (8) and having a conically converging wall (12) in the direction of flow (38).

10. An aeratign nozzle according to claim 9, wherein said liquid channel (2) has the shape of a hollow cylinder in said aeration region (5) and in said mixing region (7), said, liquid channel (2) in said aeration region (5) having an inner diameter "D1" greater than the inner diameter "D2" of said liquid channel (2) in said mixing region (7).

11. An aerating nozzle according to claim 10, wherein the length of said mixing region (7) is approximately equal to a diameter (D2) of said liquid channel (2) in said mixing region (7).

12. An aerating nozzle according to claim 9, wherein the length of said intermediate region (6) is at least three times the difference between a first diameter (D1) of said aeration region (5) and a second diameter (D2) of said mixing region (7).

13. An aerating nozzle according to claim 2, wherein said annular chamber (21) is formed by inserting said distribution bushing (9), which is formed as an integral member, into said outer sleeve (1), said distribution bushing (9) forming an inner wall and said outer sleeve (19) forming an outer wall of said annular chamber (21).

14. An aerating nozzle according to claim 9, wherein said gas supply opening (35) and said conically converging wall (12) are formed in said outer sleeve (19).

15. An aerating nozzle according to claim 9, wherein said liquid channel (2) in said mixing region (7) is formed by a connecting piece (33).

16. An aerating nozzle according to claim 15, wherein said connecting piece (33) and said outer sleeve (19) are welded to each other.

17. An aerating nozzle according to claim 15, wherein said connecting piece (33) and said outer sleeve (19) are made integral.

18. An aerating nozzle according to claim 1, wherein at least one outer diameter of said distribution bushing (9) is formed with an inner diameter (20) of said outer sleeve (19) as a fit.

19. An aerating nozzle according to claim 2, wherein said annular chamber (21) is sealed at both sides.

20. An aerating nozzle according to claim 1, wherein said outer sleeve (19) has a stop surface (26) for a face (24 and 25) of said distribution bushing (9) when said distribution bushing (9) is inserted into said outer sleeve (19).

21. An aerating nozzle according to claim 20, wherein a seal (22) is arranged between said stop surface (26) of said outer sleeve (19) and the corresponding face (24 or 25) of said distribution bushing (9).

22. An aerating nozzle according to claim 20, wherein said distribution bushing (9) is fully received in said outer sleeve (19) and pressed with a closure (27) onto said stop surface (26).

23. An aerating nozzle according to claim 22, wherein a seal (23) is arranged between said closure (27) and a face (24 or 25) of said distribution bushing (9).

24. An aerating nozzle according to claim 22, wherein said closure (27) is sealed.

25. An aerating nozzle according to claim 23, wherein said liquid channel (2) in said inlet region (4) is formed by said closure (27).

26. An aerating nozzle according to claim 22, wherein said closure (27) is adapted to be screwed.

27. An aerating nozzle according to claim 26, wherein said closure (27) is screwed by way of a union nut (29) to a threaded connection piece (30).

28. An aerating nozzle according to claim 27, wherein said threaded connection piece (30) is arranged at a beginning of said aeration region (5) outside of said outer sleeve (19) and welded thereto.

29. An aerating nozzle according to claim 27, wherein said threaded connection piece (30) is arranged at a beginning of said aeration region (5) outside of said outer sleeve (19) and made integral therewith.

30. An aerating nozzle according to claim 2, wherein a gas supply connection piece (36) is arranged at each gas supply opening (35) on said outer sleeve (19).

31. An aerating nozzle according to claim 30, wherein said gas supply connection piece (36) is welded to said outer sleeve (19).

32. An aerating nozzle according to claim 30, wherein said gas supply nozzle (36) is made integral with said outer sleeve (19).

* * * * *